(12) United States Patent
Lepretre et al.

(10) Patent No.: US 10,259,142 B2
(45) Date of Patent: Apr. 16, 2019

(54) METHOD FOR MANUFACTURING A MOLDING ELEMENT OF A MOLD FOR VULCANIZING A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jerome Lepretre, Clermont-Ferrand (FR); Patrick Andanson, Clermont-Ferrand (FR); Enrique Segoviano, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 167 days.

(21) Appl. No.: 15/102,164

(22) PCT Filed: Nov. 28, 2014

(86) PCT No.: PCT/IB2014/002589
§ 371 (c)(1),
(2) Date: Jun. 6, 2016

(87) PCT Pub. No.: WO2015/082968
PCT Pub. Date: Jun. 11, 2015

(65) Prior Publication Data
US 2016/0303771 A1 Oct. 20, 2016

(30) Foreign Application Priority Data

Dec. 6, 2013 (FR) ..................... 13 02849

(51) Int. Cl.
*B29D 30/06* (2006.01)
*B29C 33/38* (2006.01)
(Continued)

(52) U.S. Cl.
CPC ........ *B29C 33/3842* (2013.01); *B29C 33/302* (2013.01); *B29D 30/0629* (2013.01);
(Continued)

(58) Field of Classification Search
USPC ....................................... 264/219
See application file for complete search history.

(56) References Cited

U.S. PATENT DOCUMENTS 5,234,326 A * 8/1993 Galli ................. B29C 33/10
425/46
5,340,294 A * 8/1994 Kata ................. B29C 33/10
264/219
(Continued)

FOREIGN PATENT DOCUMENTS

WO 99/48674 A1 9/1999

OTHER PUBLICATIONS

Weifeng Xie et al., CN 101224541A (Translation), Jul. 23, 2008 (Year: 2008).*
(Continued)

*Primary Examiner* — Jacob T Minskey
*Assistant Examiner* — Baileigh Kate Darnell
(74) *Attorney, Agent, or Firm* — Dickinson Wright PLLC

(57) ABSTRACT

A Method for manufacturing molding elements for molds is provided herein. The molds are used for molding tires provided with a tread with a circumferential arrangement of tread pattern elements. The method includes: a step consisting in aligning a plurality of basic linings; a step consisting in generating, from the basic tread circumference portion, an intermediate support; and obtaining an unfinished molding element from the intermediate support.

14 Claims, 2 Drawing Sheets

(51) Int. Cl.
*B29C 33/30* (2006.01)
*B29L 30/00* (2006.01)
*B29K 83/00* (2006.01)
*B29L 31/00* (2006.01)

(52) U.S. Cl.
CPC ........ *B29C 33/301* (2013.01); *B29K 2083/00* (2013.01); *B29L 2030/00* (2013.01); *B29L 2031/757* (2013.01)

(56) References Cited

U.S. PATENT DOCUMENTS

| | | | | |
|---|---|---|---|---|
| 5,843,326 | A * | 12/1998 | Bellot | B29C 33/42 249/102 |
| 6,551,086 | B1 * | 4/2003 | Tuttle | B29C 33/0033 264/219 |
| 2002/0176792 | A1 | 11/2002 | Tuttle et al. | |
| 2005/0248053 | A1 | 11/2005 | Hyakutake et al. | |
| 2009/0095427 | A1 * | 4/2009 | Hyodo | B29D 30/0629 156/394.1 |
| 2009/0162465 | A1 * | 6/2009 | Komornik | B22F 3/1109 425/47 |
| 2011/0042858 | A1 | 2/2011 | Vinch, Jr. | |
| 2011/0254185 | A1 * | 10/2011 | Liew | B29C 33/303 264/40.5 |
| 2011/0259487 | A1 * | 10/2011 | Montbel | B29D 30/0606 152/151 |
| 2011/0309556 | A1 * | 12/2011 | Lauwers | B29D 30/0629 264/497 |
| 2012/0043693 | A1 | 2/2012 | King et al. | |

OTHER PUBLICATIONS

Kodera Takao et al., EP 2399730A1 (Translation), Dec. 28, 2011 (Year: 2011).*

* cited by examiner

METHOD FOR MANUFACTURING A MOLDING ELEMENT OF A MOLD FOR VULCANIZING A TIRE

CROSS-REFERENCE TO RELATED APPLICATIONS

This application is a 371 national phase entry of PCT/IB2014/002589, filed 28 Nov. 2014, which claims the benefit of French Patent Application No. 13/02849, filed 6 Dec. 2013, the contents of which are incorporated herein by reference for all purposes.

BACKGROUND

The aspects disclosed herein relate to a method of manufacturing molding elements for molds intended for molding tires provided with a tread comprising a circumferential arrangement of tread pattern elements.

The mass production of tires calls for a particularly complex and costly industrial process involving numerous machines, complex methods and numerous preparatory phases. One side effect of the complexity of the process is that it is not very flexible, reducing the options for modifying configurations or arrangements after a manufacturing line has been set up. This lack of flexibility is particularly applicable to the molds intended for the vulcanizing and molding phases.

Now, vehicles are being increasingly produced in short production runs, with specific features that make these vehicles unique and attractive by comparison with those that are more mass-produced. Of the specification options on offer, the tires are often one of the key distinguishing features.

There is therefore a significant and growing need to improve the flexibility of tire manufacturing processes. Furthermore, there is a growing need to simplify and facilitate the preparation of tires provided with attractive specific features.

Moreover, document WO9948674 describes a casting model for the manufacture of a segment intended to be mounted in a ring-shaped mold. The casting model comprises at least one patterned surface which is preferably equipped with pattern parts. The patterned surface of the model is designed to be formed from at least two pattern elements. The document also describes a method of manufacturing a casting model.

Document US2012/043693 relates to molding methods used to manufacture microstructured objects. By including a plurality of microfeatures on the surface of an object, other features, such as an increase in the hydrophobic nature, may be conferred upon the object. Certain molding and casting methods described in that document allow the manufacture of objects that have both micro and macro features.

Application US2011/042858 describes a method of manufacturing a mold having a surface prepared for production. One of the methods described in that document relates to the computerized creation of an enlarged geometry model of a mold. A physical model of the mold is thus produced on the basis of the computer model using material that disintegrates at a certain temperature. A ceramic molding of the physical model of the mold is created and molten metal is poured into and cast in the ceramic molding, disintegrating the physical model of the mold. The molten metal is then cooled and the ceramic mold is removed to reveal the mold the surface of which is prepared for production.

Document US2005/0248053 describes a mold comprising a plurality of modules placed side by side. A wedge, the thickness of which is specifically controlled, makes it possible to create a slot between each of the modules.

Document US2002/0176792 relates to a method of manufacturing a tire mold segment. A segmented tire model made of refractory material is formed by segments of the tire model. The segments are obtained by sintering. Blades may be mounted in the segments of the tire model.

None of the aforementioned documents offers a solution that makes it possible to increase the flexibility of the modes of manufacture enough to meet the new requirements in terms of product ranges that are increasingly subject to rapid evolution.

SUMMARY

One object of the disclosure is to provide a manufacturing method that makes it easier to modify the visual features of the tires.

Another object of the disclosure is to provide a method of manufacture that makes it possible to reduce raw material wastage when making modifications to the visual features of the tires.

Yet another object is to provide a method that makes it possible to optimize tire manufacture, particularly in terms of the mold preparation phase.

To achieve this, the aspects disclosed herein provide a method for manufacturing molding elements for molds intended for molding tires provided with a tread comprising a circumferential arrangement of tread pattern elements, the method comprising:

a) a step consisting in aligning a plurality of basic linings made of flexible material so as to form a basic tread circumference portion;

b) a step consisting in generating, from the basic tread circumference portion, an intermediate support corresponding to the tread circumference portion;

c) a step of obtaining an unfinished molding element from the intermediate support;

each of the basic linings corresponding to a pattern element of the circumferential arrangement of the tread of the tire that is to be molded.

This method allows a great deal of flexibility in how the molds are configured. Because each basic lining corresponds to a pattern element of the tread of the tire that is to be molded, the resulting molding elements enjoy this same characteristic. By using molding elements with different pattern elements, the architecture of the tread can be adapted or modified without the need to replace the entire mold. Depending on the requirements for mold types and quantities required for each type of molding element, the quantities produced for each type can easily be adjusted because the intermediate mold can house the basic linings according to the production requirements for these various types of molding element, for example favouring one type over another.

The simultaneous manufacture of a plurality of molding elements allows the manufacture and process to be optimized, simplifying the tooling and reducing waste.

According to one advantageous embodiment, the intermediate support is made in an intermediate mold.

The intermediate mold makes it possible to group the basic linings together simply, quickly and with accurate positioning. The step of molding the intermediate support is thereby optimized, with optimization of the overall space and particularly advantageous accuracy of creation.

According to one advantageous embodiment, the flexible parts extend one another in the intermediate mold.

This arrangement makes it possible to limit the empty or non-productive spaces between the pattern elements.

In one advantageous alternative form, the flexible parts in the intermediate mold are wedged in position using a wedge, this wedge having a greater hardness than that of the soft material, thus making it possible to transmit compressive loadings without damaging the basic linings.

The wedge makes placement easier and affords excellent positional accuracy.

According to another advantageous alternative form, the method moreover comprises a step consisting in cutting the unfinished element to form a plurality of segments or cut elements, the latter being able to be assembled in a predetermined order to form a segment of the mold.

One single molding phase therefore allows several segments or molding elements to be obtained.

According to another alternative form of embodiment, the cut elements comprise at least an additional thickness of material and are machined to finalize the dimensions prior to assembly in the mold.

This step makes it possible to optimize the accuracy of the molding elements.

According to another alternative form of embodiment, the intermediate support is made of a destructible material.

According to yet another alternative form of embodiment, the unfinished molding element is made of a reusable material.

According to yet another advantageous embodiment, the method comprises a prior step of producing a basic die (or jig), making it possible to obtain corresponding basic linings.

In another alternative form, the basic lining is made of silicone, and preferably of silastene. This then yields the possibility of reusing the basic lining for other production runs.

According to various alternative forms of embodiment, step (a) of aligning the basic linings may be performed on a flat or concave support.

The method can thus be adapted to suit different types of mold.

The disclosure also provides a mold comprising a support on which a plurality of molding elements obtained using the method described hereinabove are circumferentially aligned.

The disclosure also provides a tire obtained by molding and vulcanizing using a mold comprising a plurality of circumferential linings/segments obtained by the method of manufacture described hereinabove.

In one advantageous alternative form, the tire comprises a tread provided with a plurality of pattern elements arranged in a circumferential alternation, each of the pattern elements of the circumferential arrangement corresponding to a pattern element of a basic lining used in the method of manufacture described hereinabove.

DESCRIPTION OF THE FIGURES

Further features and advantages will become apparent from the following description given by way of non-limiting example with reference to the attached drawings in which.

In the description that will follow, elements that are substantially identical or similar will be denoted by identical references.

DETAILED DESCRIPTION

A "tire" means all types of resilient tread whether or not it is subjected to an internal pressure.

The "tread" of a tire means a quantity of rubber compounds delimited by lateral surfaces and by two main surfaces one of which is intended to come into contact with a roadway when the tire is being driven on.

A "destructible material" means a material that is easy to remove after the intended element has been molded, by destroying it, such as by breaking it or by cutting it up for example.

A "reusable material" means a material having mechanical properties of which allow it to be reused several times over in an industrial tire molding method.

Figure 2:
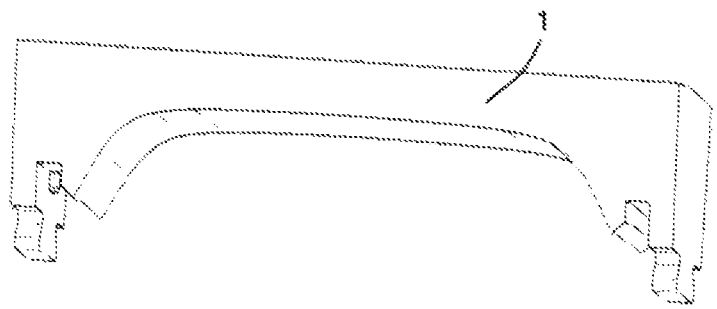
FIG. 2 is a schematic perspective view of one example of a basic lining.

FIG. 2 illustrates an example of a basic lining 1 made of a flexible material such as silicone for example, and preferably from silastene. The lining has a substantially elongate profile with, at each of its ends, a securing member, preferably in the form of a dovetail.

Figure 1:
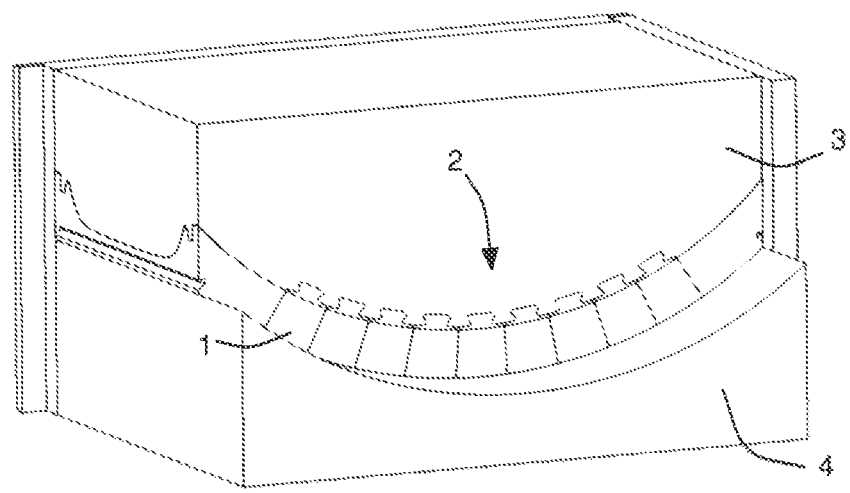
FIG. 1 schematically depicts the key elements for creating an intermediate support from an aligned row of basic linings.

As shown in FIG. 1, a plurality of basic linings 1 are aligned transversely one against the other to form a basic tread circumference portion 2. In order to keep the basic linings correctly assembled against one another, one or more supports such as wedges, made of a material of a hardness higher than that of the linings, are provided, for example on each side of the linings located at the lateral ends.

A cradle-shaped intermediate mold 4 acts as a support for the linings. The resulting assembly means that an intermediate support 3, corresponding to the tread circumference portion, can be molded. This intermediate support 3 is advantageously made of a destructible material such as plaster.

Figure 3:
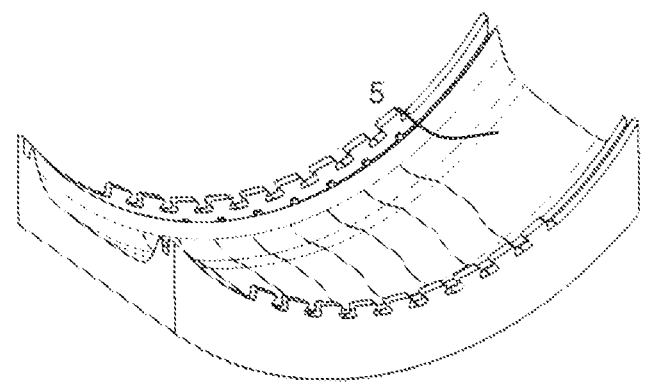
FIG. 3 is a schematic perspective view of one example of a semi-finished molding element.

FIG. 3 illustrates the result of the next step, which consists in creating an unfinished molding element 5 for a tire mold. An intermediate support 3 is used for that so as to create an unfinished molding element by molding. After this molding, the intermediate support 3 used is destroyed to release the newly molded component. As this is an element that is likely to be used numerous times over in the production phases, the unfinished element is made of a "reusable material" made from a light metal alloy such as aluminium. That material also has the advantage that it can be machined.

Figure 4:
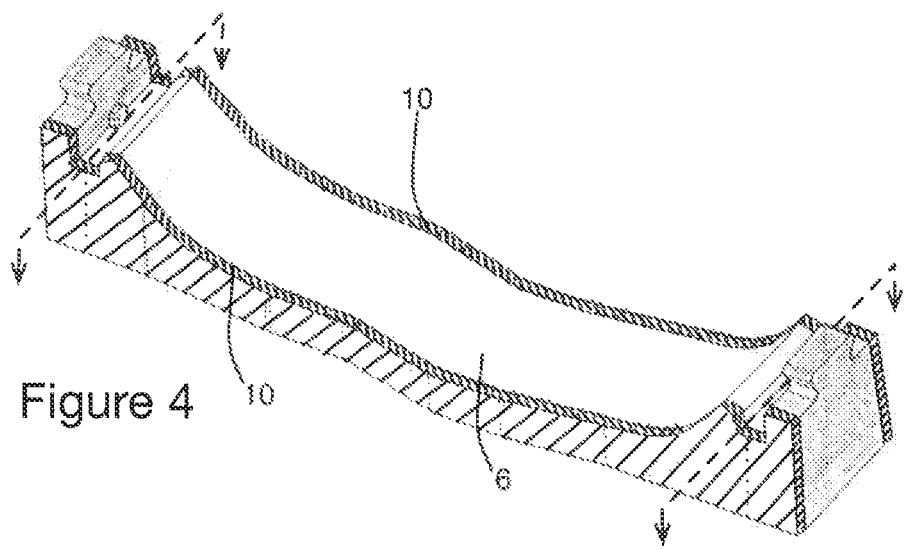
FIG. 4 is a schematic perspective view of one example of a segment 6 after cutting.

FIG. 4 shows the result of the subsequent step consisting in cutting the semi-finished molding element into a plurality of cut molding segments 6 or elements. The cutting is advantageously performed using a very high pressure water jet cutting machine. In order to carry out this cutting, an additional thickness of material 10 is provided in the design of the components on the faces of the lining. This additional thickness 10 is removed during the water jet cutting and/or during a subsequent machining phase in which the components are machined to the required final size and shape.

Figure 5:
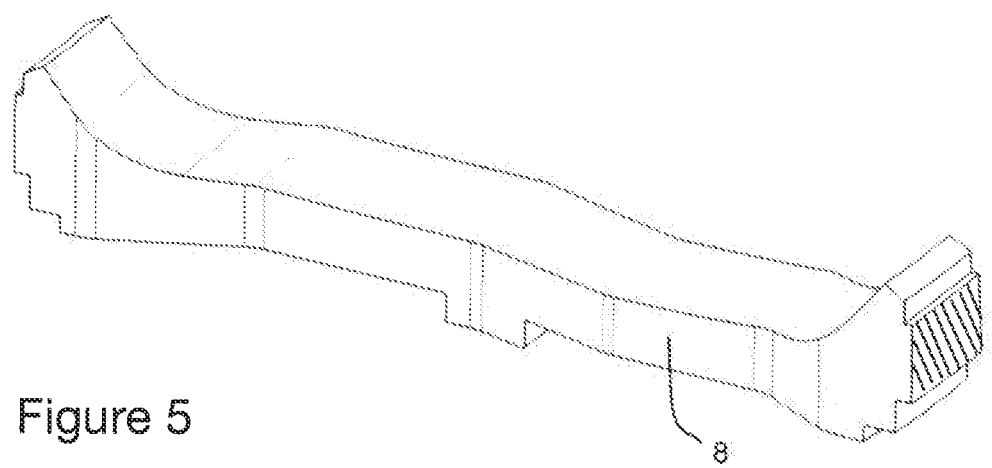
FIG. 5 is a schematic perspective view of one example of a segment 6 after machining.

FIG. 5 illustrates the machined segments 8 obtained during the step of machining the segments 6. In this step, each of the segments 6 is machined to remove the zones of material that are not needed for the subsequent operations and/or to add additional patterning or detail of use in the molding of the tires.

Figure 6:
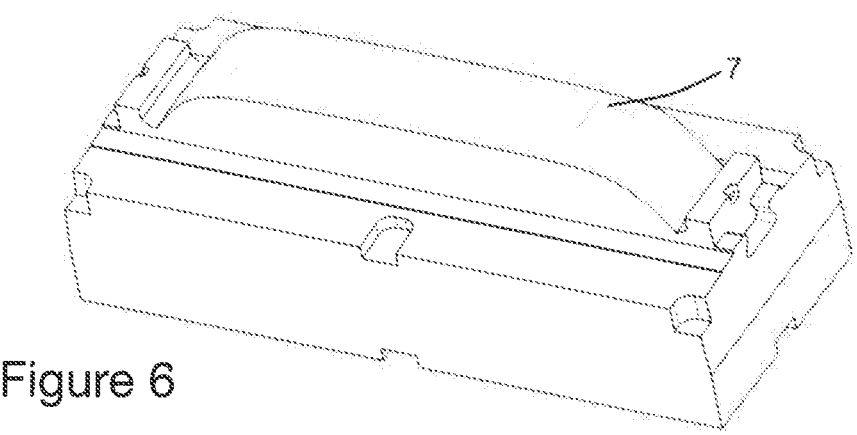
FIG. 6 is a schematic perspective view of one example of a basic die.

FIG. 6 shows a prior step involving creating a basic die 7 or jig, preferably using resin. This step is performed in a way known per se and serves to form a component the shape of which is the negative of one of the segments 6.

The invention claimed is:

1. A method for manufacturing molding elements for molding tires provided with a tread with a circumferential arrangement of tread pattern elements, the method comprising the steps of aligning a plurality of basic linings made of flexible material so as to form a basic tread circumference portion, with each of the plurality of the basic linings corresponding to a pattern element of the circumferential arrangement of the tread of the tire that is to be molded;

using the basic tread circumference portion formed by the basic linings, molding an intermediate support out of a non-metallic material such that the intermediate support has a surface that corresponds to the tread circumference portion;

using the intermediate support, making an unfinished molding element that is made out of metal; and cutting the unfinished molding element into a plurality of molding elements, the plurality of molding elements being assembleable in a predetermined order to form a mold.

2. The method of manufacture according to claim 1, wherein the plurality of cut elements include an additional thickness of material, and further comprising a phase of machining the said additional thickness for finalizing the dimensions prior to assembly in the mold.

3. The method of manufacture according to claim 1, wherein the intermediate support is made in an intermediate mold.

4. The method of manufacture according to claim 3, wherein the basic linings extend one another in the intermediate mold.

5. The method of manufacture according to claim 3, wherein the basic linings in the intermediate mold are wedged in position using a wedge, the wedge having a different hardness from the flexible material.

6. The method of manufacture according to claim 1, wherein the intermediate support is made of a destructible material.

7. The method of manufacture according to claim 1, wherein the unfinished molding element is made of a reusable material.

8. The method of manufacturing according to claim 1, further comprising, prior to the aligning, producing a basic die from resin, to obtain corresponding basic linings.

9. The method of manufacture according to claim 1, wherein the basic lining is made of silicone.

10. The method of manufacture according to claim 9, wherein the basic lining is made of silastene.

11. The method of manufacture according to claim 1, wherein the aligning of the basic linings is performed on a flat or concave support.

12. The method of manufacture according to claim 1, further comprising a mold having a support on which a plurality of the molding elements are circumferentially aligned.

13. The method of manufacture according to claim 1, further comprising a tire obtained by molding and vulcanizing using the plurality of molding elements.

14. The method of manufacture according to claim 13, further comprising:

a tread provided with a plurality of pattern elements arranged in a circumferential alternation, with each of the plurality of pattern elements of the circumferential arrangement corresponding to a pattern element of a basic lining.

\* \* \* \* \*